(12) United States Patent  (10) Patent No.: US 8,988,768 B2
Tokuhisa et al.  (45) Date of Patent: Mar. 24, 2015

(54) LASER DEVICE

(75) Inventors: Akira Tokuhisa, Tokyo (JP); Naoto Inaba, Hiratsuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/980,757

(22) PCT Filed: Jan. 18, 2012

(86) PCT No.: PCT/JP2012/050963
§ 371 (c)(1),
(2), (4) Date: Oct. 8, 2013

(87) PCT Pub. No.: WO2012/099166
PCT Pub. Date: Jul. 26, 2012

(65) Prior Publication Data
US 2014/0036349 A1 Feb. 6, 2014

(30) Foreign Application Priority Data

Jan. 19, 2011 (JP) ................................. 2011-009122
Jan. 19, 2011 (JP) ................................. 2011-009126

(51) Int. Cl.
*H01S 3/131* (2006.01)
*H01S 3/091* (2006.01)
*H04B 10/564* (2013.01)
(Continued)

(52) U.S. Cl.
CPC ............. *H01S 3/0912* (2013.01); *H01S 3/0014* (2013.01); *H01S 3/06754* (2013.01); *H01S 3/10015* (2013.01); *H01S 2301/02* (2013.01); *H04B 10/564* (2013.01)
USPC .................................................... 359/341.43

(58) Field of Classification Search
USPC .................................................... 359/341.43
See application file for complete search history.

(56) References Cited

U.S. PATENT DOCUMENTS 5,355,250 A  10/1994  Grasso et al.
5,475,521 A  12/1995  Heidemann
(Continued)

FOREIGN PATENT DOCUMENTS

EP  0 507 367 A1  10/1992
EP  0 515 179 A2  11/1992
(Continued)

OTHER PUBLICATIONS

Nov. 12, 2013 Office Action issued in Japanese Patent Application No. 2012-553752 (with English translation).
(Continued)

*Primary Examiner* — Mark Hellner
(74) *Attorney, Agent, or Firm* — Oliff PLC

(57) ABSTRACT

A laser device includes: an optical fiber amplifier that amplifies and emits a signal light; a control unit that controls pumping power for pumping the optical fiber amplifier; and a signal light detector that detects signal light being propagated to the optical fiber amplifier or an ASE photodetector that detects light that is emitted from the optical fiber amplifier and that has wavelength for which the gain is higher than for the signal light, wherein the control unit suppresses the pumping power for pumping the optical fiber amplifier, when the intensity of the signal light detected by the signal light detector becomes less than or equal to a predetermined signal reference value, or when the intensity of the spontaneously emitted light detected by the ASE photodetector becomes greater than or equal to a predetermined ASE reference value.

17 Claims, 12 Drawing Sheets

(51) Int. Cl.
  *H01S 3/00*    (2006.01)
  *H01S 3/067*   (2006.01)
  *H01S 3/10*    (2006.01)

(56) References Cited

U.S. PATENT DOCUMENTS

| | | | |
|---|---|---|---|
| 5,589,975 A | | 12/1996 | Nakamura et al. |
| 5,633,749 A | * | 5/1997 | Shibuya .................. 359/341.43 |
| 5,680,246 A | * | 10/1997 | Takahashi et al. ....... 359/341.43 |
| 7,940,453 B2 | * | 5/2011 | Murison et al. ............ 359/341.1 |
| 2001/0038488 A1 | * | 11/2001 | Kinoshita ................ 359/341.41 |
| 2008/0130101 A1 | | 6/2008 | Kakui |

FOREIGN PATENT DOCUMENTS

| | | |
|---|---|---|
| EP | 0 569 769 A1 | 11/1993 |
| JP | A-4-68830 | 3/1992 |
| JP | A-5-130043 | 5/1993 |
| JP | A-5-206557 | 8/1993 |
| JP | A-6-120899 | 4/1994 |
| JP | A-8-65249 | 3/1996 |
| JP | A-10-51395 | 2/1998 |
| JP | A-2000-200747 | 7/2000 |
| JP | A-2000-216458 | 8/2000 |
| JP | A-2002-50815 | 2/2002 |
| JP | A-2007-294931 | 11/2007 |
| JP | A-2009-176944 | 8/2009 |

OTHER PUBLICATIONS

International Search Report issued in International Patent Application No. PCT/JP2012/050963 mailed Mar. 6, 2012.

Written Opinion of the International Scarching Authority issued in International Patent Application No. PCT/JP2012/050963 mailed Mar. 6, 2012.

Jul. 8, 2014 Office Action issued in Japanese Patent Application No. 2012-553752 (with English translation).

* cited by examiner

LASER DEVICE

TECHNICAL FIELD

The present invention relates to a laser device that amplifies and outputs signal light with an optical fiber amplifier.

BACKGROUND ART

Laser devices that amplify and output signal light with optical fiber amplifiers are widely known, for example as light sources for microscopes, shape measurement devices, exposure devices, and so on. The output wavelength of a laser device is determined according to the application and the function of the device to which it is to be installed, and an optical fiber amplifier is used that is doped with an excitation medium that corresponds to that output wavelength. For example, an erbium doped optical fiber amplifier (EDFA) in which a quartz optical fiber is doped with erbium (Er), an ytterbium doped optical fiber amplifier (YDFA) that is doped with ytterbium (Yb), and so on are known as optical fiber amplifiers (refer to Patent Document #1 and Patent Document #2).

CITATION LIST

Patent Literature

Patent Document #1: Japanese Laid-Open Patent Publication No. 2000-200747;
Patent Document #1: Japanese Laid-Open Patent Publication No. 2002-050815.

SUMMARY OF THE INVENTION

Technical Problems

A optical fiber amplifier has an amplification characteristic corresponding to the laser medium that has been doped into its core. For example, the principal amplification band of a YDFA (ytterbium doped optical fiber amplifier) is 1030~1100 nm. If an attempt is made with a YDFA to output amplified light at 1064 nm, this being the same as the oscillation wavelength of a NdYAG laser, then parasitic oscillations in the vicinity of wavelength 1030 nm can easily be generated. This is because, in the gain distribution of a YDFA, the gain becomes higher at the shorter wavelength side and becomes lower at the longer wavelength side, so that the gain is significantly higher at $\lambda=1030$ nm than at $\lambda=1064$ nm.

As a result, if for example damage to the laser light source occurs or the like, so that, with the YDFA in the pumped state, the intensity of the signal light that is incident upon the optical fiber amplifier greatly decreases, or the intensity of that signal light becomes zero, then the population inversion density of the ytterbium abruptly rises and the gain of the amplifier increases abnormally, and the laser starts to oscillate in the vicinity of 1030 nm wavelength. As a result, there is the problem that there is a danger of damage being caused to the optical fiber amplifier itself or to auxiliary optical elements.

Furthermore if some type of reflective element is present at a location other than the amplification area of the YDFA that is in the pumped state, for example due to fouling or the like at an incident or emission surface of the fiber, or at an incident or emission surface of a wavelength conversion optical element that wavelength converts the light emitted from the optical fiber amplifier or the like, then it may happen that spontaneously emitted light in the vicinity of 1030 nm (ASE light: Amplified Spontaneous Emission) generated by spontaneous emission may be reflected by the reflective element and may return back into the interior of the optical fiber amplifier, and this can also cause oscillation. In this case as well, in a similar manner to that described above, there is the problem that the output of the amplified light propagated within the fiber and of the output light that is emitted may become high, and there is a danger of damage being caused to the optical fiber amplifier itself or to auxiliary optical elements.

Moreover if the YDFA is pumped in a state in which some type of reflective element is present in other than the amplification area of the optical fiber amplifier, for example due to fouling or the like at an incident or emission surface of the optical fiber amplifier, or at an incident or emission surface of a wavelength conversion optical element that wavelength converts the light emitted from the optical fiber amplifier or the like, then it may happen that ASE light is reflected back by the reflective element and may return into the fiber, and this also can cause oscillation. As a result, there is a danger of damage being caused to the optical fiber amplifier itself or to auxiliary optical elements.

The present invention has been made in consideration of the problems described above, and its object is to provide a laser device that prevents unintended oscillation in the optical fiber amplifier on a pre-emptive basis.

Solution to Problems

According to the first aspect of the present invention, a laser device, comprises: an optical fiber amplifier having gain in a wavelength band that includes signal light, and that amplifies and emits that signal light; a signal light detector that detects signal light being propagated to the optical fiber amplifier; and a control unit that controls pumping power for pumping the optical fiber amplifier, wherein the control unit suppresses the pumping power for pumping the optical fiber amplifier, when the intensity of the signal light detected by the signal light detector becomes less than or equal to a predetermined signal reference value.

In the first aspect of the present invention, it is preferred that the predetermined signal reference value is set on the basis of the intensity of the signal light when, in the gain distribution of the optical fiber amplifier that rises along with reduction of the intensity of the signal light propagated to the optical fiber amplifier, the gain for light at a wavelength at which the gain is higher than for the signal light becomes equal to the oscillation threshold value. Moreover, it is preferred that the time period from when the intensity of the signal light detected by the signal light detector becomes less than or equal to the predetermined signal reference value until the pumping power is suppressed is set on the basis of the time period until the gain for light of a wavelength at which the gain, in the gain distribution of the optical fiber amplifier that rises along with decrease of the intensity of the signal light incident upon the optical fiber amplifier, is higher than the gain for the signal light, becomes equal to the oscillation threshold value.

Moreover, it is preferred that the laser device further comprises an ASE photodetector that detects light that is emitted from the optical fiber amplifier and that has wavelength for which the gain, in the gain distribution of the optical fiber amplifier, is higher than for the signal light, and wherein the control unit suppresses the pumping power, when the intensity of the spontaneously emitted light detected by the ASE photodetector becomes greater than or equal to a predetermined ASE reference value.

Moreover, it is preferred that the predetermined ASE reference value is set on the basis of the intensity of spontaneously emitted light when the gain for light at a wavelength at which the gain is higher than for the signal light of the optical fiber amplifier becomes equal to the oscillation threshold value. Moreover, it is preferred that the time period from when the intensity of the spontaneously emitted light detected by the ASE photodetector becomes greater than or equal to the predetermined ASE reference value until the pumping power is suppressed is set on the basis of the time period until the gain for light of a wavelength at which the gain of the optical fiber amplifier is higher than for the signal light becomes equal to the oscillation threshold value. Moreover, it is preferred that the ASE photodetector is provided on the signal light incidence side of the optical fiber amplifier, and detects spontaneously emitted light propagated backward through the optical fiber amplifier towards its incidence side.

According to the second aspect of the present invention, a laser device, comprises: an optical fiber amplifier having gain in a wavelength band that includes signal light, and that amplifies and emits that signal light; an ASE photodetector that detects light that is emitted from the optical fiber amplifier and that has wavelength for which the gain, in the gain distribution of the optical fiber amplifier, is higher than for the signal light; and a control unit that controls pumping power for pumping the optical fiber amplifier, wherein the control unit suppresses the pumping power for pumping the optical fiber amplifier, when the intensity of the spontaneously emitted light detected by the ASE photodetector becomes greater than or equal to a predetermined ASE reference value.

In the second aspect of the present invention, it is preferred that the predetermined ASE reference value is set on the basis of the intensity of spontaneously emitted light when the gain for light at a wavelength at which the gain is higher than for the signal light of the optical fiber amplifier becomes equal to the oscillation threshold value. Moreover, it is preferred that the time period from when the intensity of the spontaneously emitted light detected by the ASE photodetector becomes greater than or equal to the predetermined ASE reference value until the pumping power is suppressed is set on the basis of the time period until the gain for light of a wavelength at which the gain of the optical fiber amplifier is higher than for the signal light becomes equal to the oscillation threshold value. Moreover, it is preferred that the ASE photodetector is provided on the signal light incidence side of the optical fiber amplifier, and detects spontaneously emitted light propagated backward towards the incidence side of the optical fiber amplifier.

Moreover, it is preferred that the laser device further comprises a signal light detector that detects the signal light incident upon the optical fiber amplifier, and wherein the control unit suppresses the pumping power when the intensity of the signal light detected by the signal light detector becomes less than or equal to a predetermined signal reference value.

Moreover, it is preferred that the predetermined signal reference value is set on the basis of the intensity of the signal light when, in the gain distribution of the optical fiber amplifier that rises along with reduction of the intensity of the signal light incident into the optical fiber amplifier, the gain for light at a wavelength at which the gain is higher than for the signal light becomes equal to the oscillation threshold value. Moreover, it is preferred that the time period from when the intensity of the signal light detected by the signal light detector becomes less than or equal to the predetermined signal reference value until the pumping power is suppressed is set on the basis of the time period until the gain for light of a wavelength at which the gain, in the gain distribution of the optical fiber amplifier that rises along with decrease of the intensity of the signal light incident upon the optical fiber amplifier, is higher than the gain for the signal light becomes equal to the oscillation threshold value.

It should be understood that, in the laser device of the second aspect, it is possible to configure that the ASE photodetector is provided on the signal light incidence side of the optical fiber amplifier, and detects spontaneously emitted light propagated backward through the optical fiber amplifier towards its incidence side.

Moreover, in the laser devices of the first and second aspects, it is preferred that an optical fiber coupler having four ports is provided on the incidence side of the optical fiber amplifier, and wherein the signal light, the optical fiber amplifier, the signal light detector, and the ASE photodetector are connected to the four ports.

In the laser devices of the first and second aspects, it is preferred that the optical fiber amplifier is an ytterbium doped optical fiber amplifier that employs ytterbium as its laser medium, and the wavelength of the signal light is the 1.06 μm band.

Advantageous Effect of the Invention

According to the laser device according to the first aspect of the present invention, when the intensity of the signal light incident upon the optical fiber amplifier becomes less than or equal to the predetermined signal reference value, then the pumping power is suppressed and the gain of the optical fiber amplifier is reduced. Due to this, it is possible to provide a laser device that can prevent unintended oscillation of the optical fiber amplifier originating in the state of incidence of the signal light on a pre-emptive basis.

And, according to the laser device according to this first aspect that is equipped with an ASE photodetector, also when the intensity of spontaneously emitted light generated by the optical fiber amplifier becomes greater than or equal to the predetermined ASE reference value, the pumping power is suppressed so that the gain of the optical fiber amplifier is reduced. Due to this, it is possible to provide a laser device that can also prevent unintended oscillation of the optical fiber amplifier originating in spontaneously emitted light on a pre-emptive basis.

And, according to the laser device according to the second aspect of the present invention, when the intensity of the spontaneously emitted light generated by the optical fiber amplifier becomes greater than or equal to the predetermined ASE reference value, then the pumping power is suppressed and the gain of the optical fiber amplifier is reduced. Due to this, it is possible to provide a laser device that can also prevent unintended oscillation of the optical fiber amplifier originating in spontaneously emitted light on a pre-emptive basis.

Moreover, according to the laser device according to this second aspect to which a signal light detector is provided, also when the intensity of the signal light incident upon the optical fiber amplifier becomes less than or equal to the predetermined signal reference value, then the pumping power is suppressed and the gain of the optical fiber amplifier is reduced. Due to this, it is possible to provide a laser device that can prevent unintended oscillation of the optical fiber amplifier originating in the state of incidence of the signal light on a pre-emptive basis.

DESCRIPTION OF EMBODIMENTS

Embodiment #1

Figure 1:
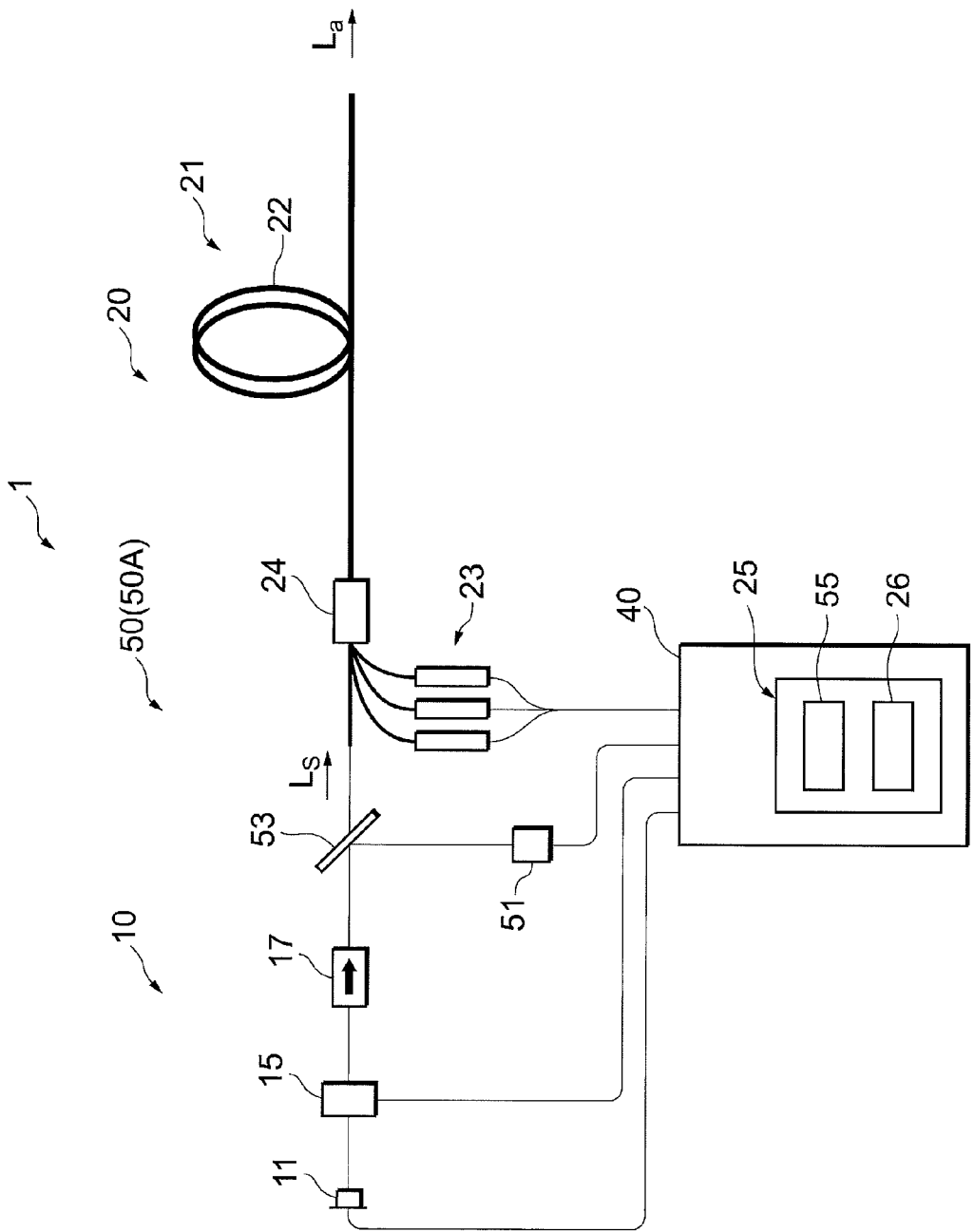
FIG. 1 is an overall structural diagram showing an example of a laser device of a first structure according to the first aspect of the present invention.

In the following, a first embodiment for implementation of the present invention will be explained with reference to the drawings. A summary structural diagram of a laser device 1 according to this first embodiment of the present invention and having a first structure is shown in FIG. 1. This laser device 1 comprises a signal light generation unit 10 that generates signal light, an amplification unit 20 that amplifies and emits the signal light generated by the signal light generation unit, and a control device 40 that controls the operation of the signal light generation unit 10 and of the amplification unit 20.

The signal light generation unit 10 is a component that generates signal light to be amplified by the amplification unit 20, and comprises a laser light source 11 such as a semiconductor laser or a bulk solidstate laser, a fiber laser, or the like. In FIG. 1, a structure is shown that uses a DFB semiconductor laser as the laser light source 11, and this structure is provided with an external modulator 15 such as an electro-optic modulation element (an EOM), an acoustic optical modulation element (AOM), or a semiconductor optical amplifier (SOA) or the like. The DFB semiconductor laser can be caused to perform either CW or pulse oscillation, with the pulse waveform of the output light being controlled at high speed due to the current waveform being controlled, and moreover can be made to output pulsed light of a single wavelength whose band has been narrowed to a predetermined wavelength range by temperature control.

With this structure, an example is shown in which pulse light is emitted from the laser light source 11 at a wavelength of 1064 nm, having a pulse repetition frequency 2 MHz and with ON interval of around 10 nsec, and this is chopped by the external modulator 15 at 1 to 2 nsec, so that light pulses whose ON interval is very short are outputted. When the external modulator 15 is employed in this manner, it is possible to suppress chirping (frequency variation) generated when the laser light source 11 is made to perform direct pulse oscillation, and it is possible to generate pulse light that is close to the Fourier transform limited pulse. Due to this, it is possible to output highly monochromatic signal light pulses on an extremely narrow band from the signal light generation unit 10. The signal light Ls generated by the signal light generation unit 10 is incident upon the amplification unit 20 via an isolator 17.

The amplification unit 20 mainly consists of an optical fiber amplifier 21 that amplifies the signal light Ls. As an optical fiber amplifier that amplifies signal light of wavelength 1064 nm, an ytterbium doped optical fiber amplifier (YDFA) that has gain in the wavelength band of 1030~1100 nm may appropriately be employed. The optical fiber amplifier 21 comprises an optical fiber 22 whose core is doped with ytterbium (Yb), a pump light source 23 that pumps the Yb, a control unit 25 that controls the pumping power supplied to the pump light source 23, and so on.

In this structure, a fiber having a double clad structure is used for the optical fiber 22, and, via a pump combiner 24, the signal light Ls outputted from the laser light output unit 10 is brought to be incident upon its core, while pump light of wavelength 976 nm outputted from the pump light source 23 is brought to be incident upon its first clad layer. A current supply 26 that generates pumping power and a power circuit breaker 55 that can cut off the supply of generated pumping power to the pump light source 23 at high speed are provided to the control unit 25. It should be understood that it also would be acceptable to use a fiber of single clad structure as the optical fiber 22, and, moreover, it would also be acceptable to build the amplification unit 20 by connecting a plurality of optical fiber amplifiers in series or in parallel.

The control device 40 controls the operation of the signal light generation unit 10 and of the amplification unit 20, and thereby causes signal light La to be outputted from the laser device 1 that has been generated by the signal light generation unit 10 and has been amplified by the amplification unit 20 to a power of from around several watts to around several tens of watts (for convenience, termed "amplified light").

An involuntary oscillation prevention device 50 (50A) that prevents the optical fiber amplifier 21 from undergoing unintended oscillation on a pre-emptive basis is provided to the laser device 1 having this structure. This involuntary oscillation prevention device 50A provided to the first structure comprises a signal light detector 51 that detects the signal light Ls incident upon the optical fiber amplifier 21, and a power circuit breaker 55 that is provided to the control unit 25.

The signal light detector 51 is provided upon an optical path that is branched off from between the laser light source 11 and the optical fiber amplifier 21, and, for example, a portion of the signal light Ls emitted from the signal light generation unit 10 is inputted to this detector 51 via a partial reflection mirror 53 that reflects one to a few percent of the signal light, or via a melt-drawn type branching coupler that diverts one to a few percent of the signal light, or the like. The signal light detector 51 is a high speed infra-red sensor operating on an MHz order or higher band: for example, a sensor that employs an InGaAs photodiode may be employed. The detection signal from the signal light detector 51 is inputted to the control unit 25.

When the intensity of the signal light Ls detected by the signal light detector 51 becomes less than or equal to a predetermined signal reference value, then the control unit 25 outputs a command signal to the power circuit breaker 55 for cutoff of the supply of power to the pump light source 23, so that the supply of pumping power to the pump light source 23 from the current supply 26 is intercepted.

The "signal reference value" described above is set on the basis of the magnitude of the gain in the 1030 nm wavelength band, and, when the intensity of the signal light Ls incident upon the optical fiber 22 decreases in the state in which the optical fiber amplifier 21 is pumped, this gain increases along therewith.

In other words, with the optical fiber amplifier 21 in the pumped state, when the intensity of the signal light Ls incident upon the optical fiber 22 decreases, the population inversion ratio of the Yb rises along with this decrease of the signal light intensity, and the overall gain distribution is elevated to a high state. At this time, in the gain distribution, the gain in the 1030 nm wavelength band becomes higher than the gain in the 1064 nm wavelength band, and if, as a result, the gain at the 1030 nm wavelength that has become elevated exceeds the oscillation threshold value (in other words, if the one way gain at the 1030 nm wavelength exceeds the return loss of the optical fiber amplifier 21), then laser oscillation at 1030 nm in the optical fiber amplifier 21 starts to occur.

The "signal reference value" is set on the basis of the intensity of the signal light when, in the gain distribution that rises along with reduction of the intensity of the signal light Ls incident upon the optical fiber amplifier 21, the gain in the 1030 nm band becomes equal to the oscillation threshold value. For example, it may be set to be equal to this intensity of the signal light Ls, or to be a higher value to which a predetermined margin is added. This signal reference value is set into a memory (not shown in the figures) provided to the control unit 25 and is stored therein.

The time period from when the intensity of the signal light Ls detected by the signal light detector 51 drops to less than or equal to the signal reference value until the pumping power is substantially cut off by the power circuit breaker 55 is set on the basis of the time period for the gain in the 1030 nm band, in the gain distribution that rises along with reduction of the intensity of the signal light Ls incident upon the optical fiber amplifier 21, to become equal to the oscillation threshold value, and is set to be equal to or less than this time period, for example to from zero to within a few percent of this time period. This time period is set into a memory (not shown in the figures) provided to the control unit 25 and is stored therein.

Figure 2:
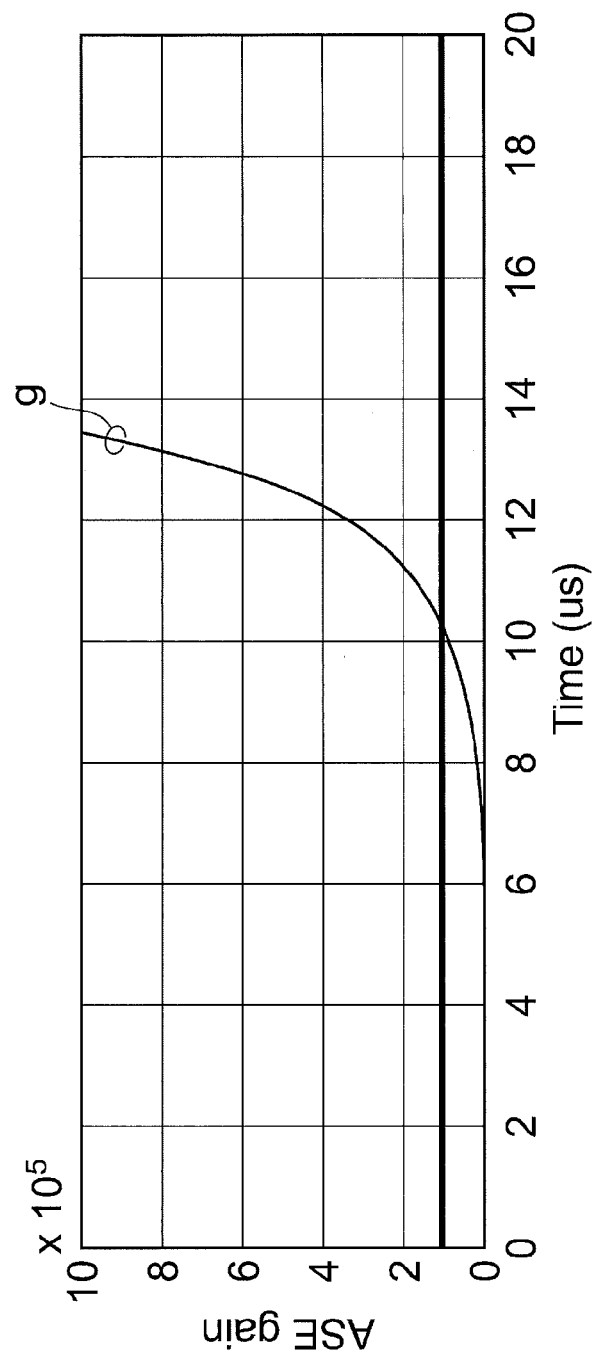
FIG. 2 is a figure showing simulation results for this first aspect of the present invention, giving an example of change over time of the gain at 1030 nm wavelength when, with an ytterbium doped optical fiber amplifier in the pumped state, the signal light is suddenly interrupted.

As a concrete example, simulation results for the change over time of the gain at the 1030 nm wavelength band when the incidence of the signal light Ls upon the optical fiber amplifier 21 is suddenly interrupted are shown in FIG. 2, for the operational state in which the power of the signal light Ls incident upon the optical fiber amplifier 21 is 0.5 W and the power of the pump light from the pump light source 23 is 120 W. The horizontal axis in FIG. 2 shows the elapsed time from when the incidence of the signal light Ls is interrupted, and the vertical axis shows the gain for light at the 1030 nm wavelength band. It should be understood that the optical fiber amplifier 21 was made to have length 3 m, core diameter 25 μm, and cladding diameter 250 μm, and that Yb was added to its core at a density of $6.9 \times 10^{25}/m^3$.

If pump light continues to be incident upon the optical fiber amplifier 21 even after the signal light Ls has been interrupted, then the population inversion ratio of the Yb rises abruptly, and the gain at the wavelength of 1030 nm increases exponentially as time elapses. The oscillation threshold value depends upon the amount of reflected light that still remains in the optical fiber amplifier 21 and so on, and its value varies according to the structure of the optical fiber amplifier. Supposing that the return loss of the optical fiber amplifier 21 is −50 dB, then it will oscillate at 1030 nm when the one-way gain becomes greater than 50 dB. It will be understood from FIG. 2 that oscillation is reached about 10 μsec from the time point at which the signal light Ls is interrupted.

Since the time period until the one-way gain of the optical fiber amplifier 21 exceeds the return loss is almost inversely proportional to the power of the pump light, accordingly oscillation is reached in a shorter time period if the power of the pump light is higher, while conversely oscillation is reached in a longer time period if the power of the pump light is lower. If the pumping power is substantially cut off within around 6 to 8 μsec from when the incident power of the signal light Ls greatly decreases, then it is possible to suppress the increase of population inversion, and to prevent the optical fiber amplifier 21 from undergoing unintended oscillation.

In this involuntary oscillation prevention device 50A, when the detection signal inputted from the signal light detector 51 becomes less than or equal to the signal reference value, then the control unit 25 outputs a command signal to the power circuit breaker 55 for interception of the supply of electrical power, and the supply of pumping power from the current supply 26 to the pump light source 23 is cut off within a few μsec. As a concrete example, a case will now be shown in which the device is constructed so as to cut off the supply of pumping power to the pump light source 23 immediately when, in the detection signal inputted from the signal light detector 51, signal light Ls has not been detected for a time period of 1 to 3 μsec, this being equivalent to two to six optical pulses (for example, a period of 2 μsec may correspond to four pulses).

Figure 3:
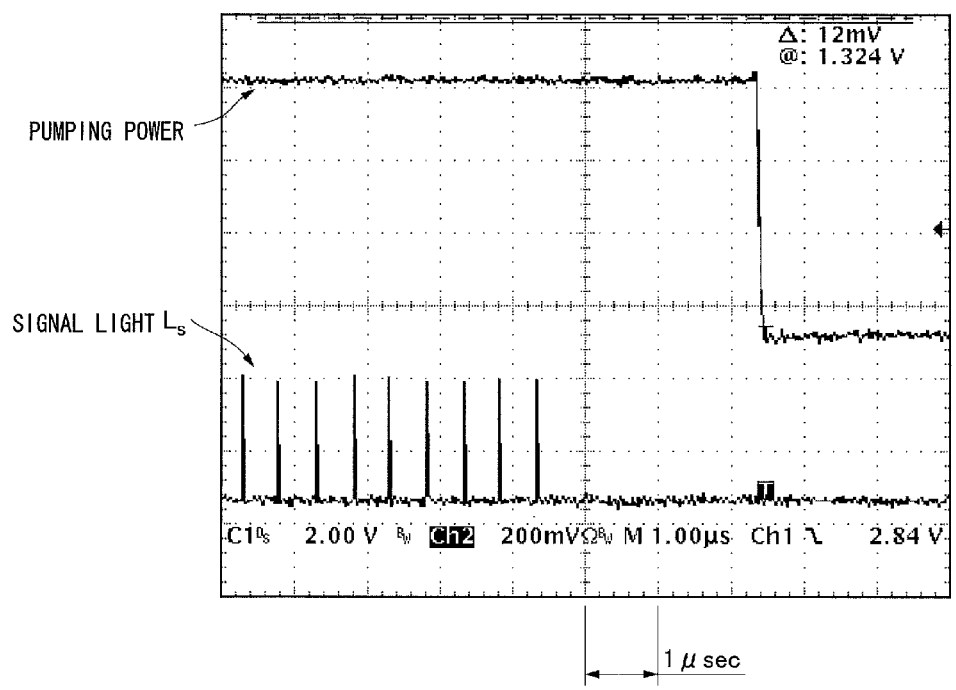
FIG. 3 is a figure showing experimental results for this first aspect of the present invention, in which suppression of the pump current by an involuntary oscillation prevention device is observed.

Experimental results observed for a situation in which the pump current is intercepted by such an involuntary oscillation prevention device are shown in FIG. 3. The horizontal axis in FIG. 3 shows time (1 μsec per division), while the vertical axis shows the pumping power and the optical intensity of the signal light Ls. In this embodiment, the pumping power to the pump light source 23 is cut off after interruption has been confirmed for 2 μsec, that corresponds to four optical pulses, and the time period required for the power circuit breaker 55 to cut off the pumping power is less than 1 μsec.

In the laser device 1 equipped with this involuntary oscillation prevention device 50A, when the incident power of the signal light Ls greatly decreases while the optical fiber amplifier 21 continues to be in the pumped state, the pumping power is substantially cut off before the gain at the 1030 nm wavelength rises as far as the oscillation threshold value, so that it is possible to prevent the optical fiber amplifier 21 from undergoing unintended oscillation. According to this structure, it is also possible to prevent the optical fiber amplifier 21 from undergoing unintended oscillation, not only if the laser light source 11 goes off with the optical fiber amplifier in the pumped state, but also, for example, if cutoff of the signal light Ls occurs due to damage or open circuiting of the laser light source 11 or of the external modulator 15, or due to entry of some foreign material into the optical path between the laser light source 11 and the optical fiber amplification unit 21, or due to breaking of the incident portion of the optical fiber 22 or the like; and, as a result, it is possible to prevent the occurrence of damage to the structural components of the system and so on, on a pre-emptive basis.

Figure 4:
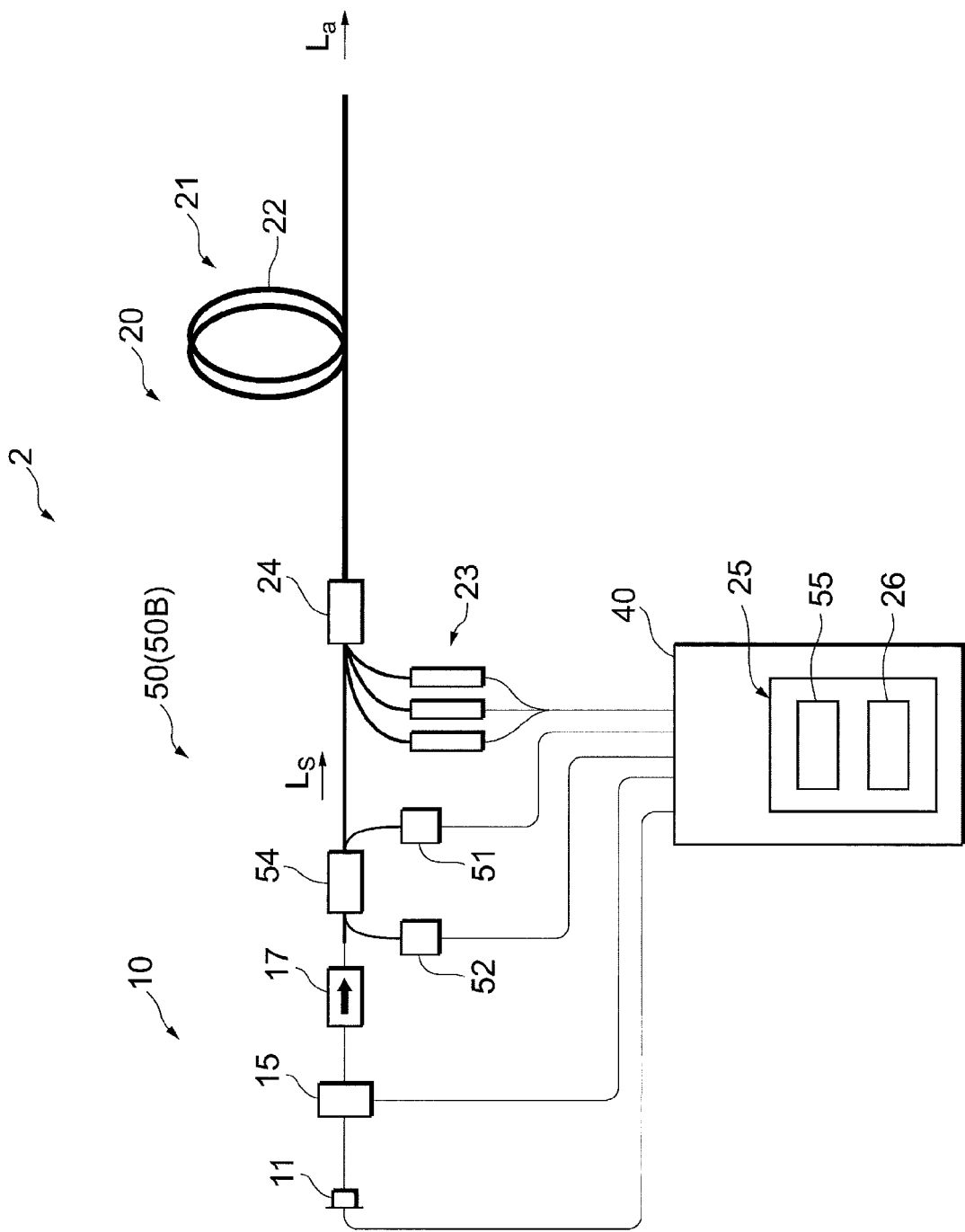
FIG. 4 is an overall structural diagram showing an example of a laser device of a second structure according to the first aspect of the present invention.

Next, an involuntary oscillation prevention device 50 (50B) having a second structure will be explained with reference to FIG. 4. A summary structural diagram of a laser device 2 that includes this involuntary oscillation prevention device 50B is shown in FIG. 4. To structural elements that are similar to ones of the laser device 1 described above, the same reference symbols are appended, and duplicated explanation is omitted. This involuntary oscillation prevention device 50B is constructed by further adding, to the involuntary oscillation prevention device 50A of the first structure described above, an ASE photodetector 52 that detects light of 1030 nm wavelength emitted from the optical fiber amplifier 21.

Figure 5:
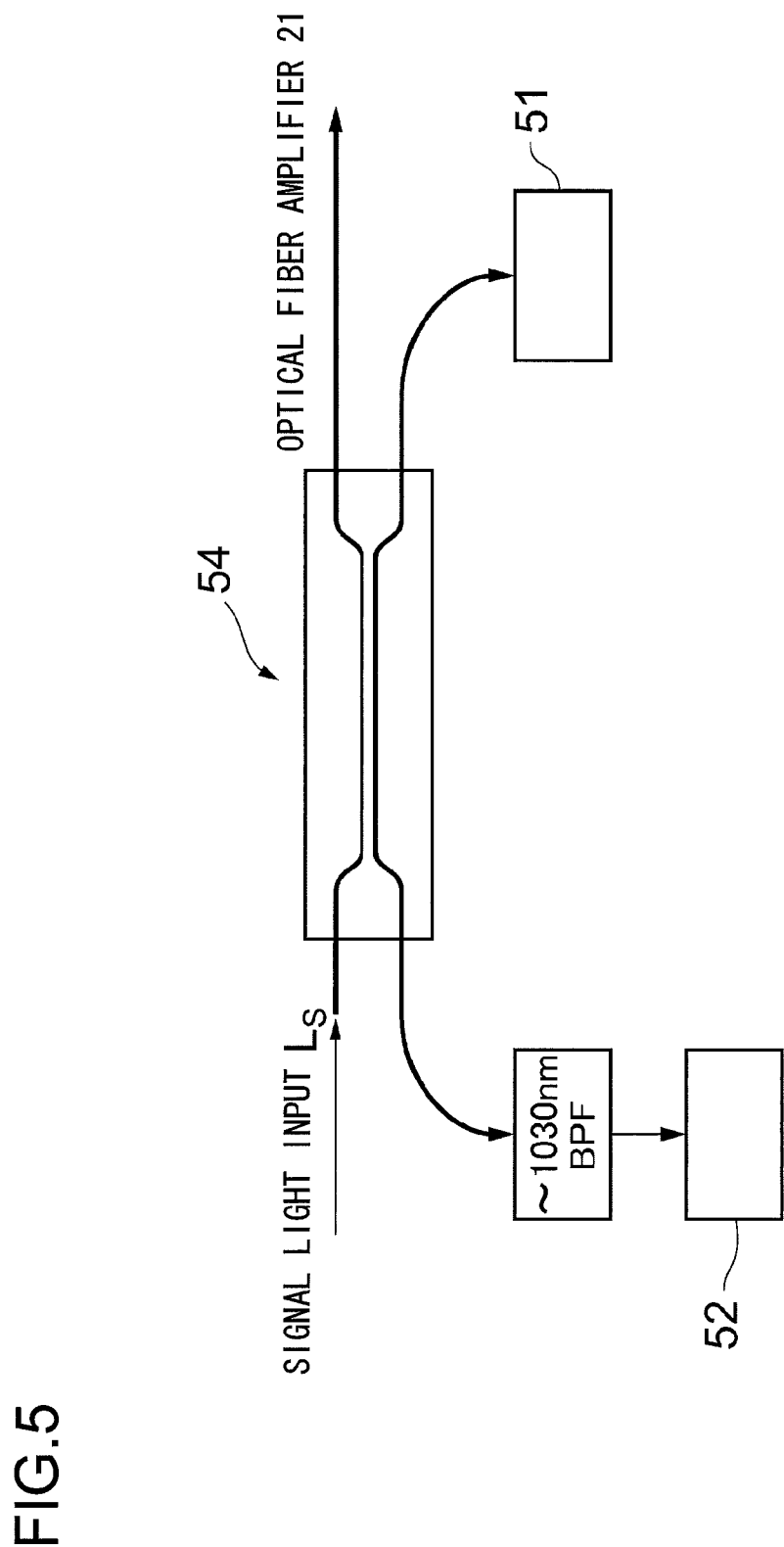
FIG. 5 shows an example, for the first aspect of the present invention, of a connection structure of an optical fiber coupler.

In the laser device 2 shown in FIG. 4, a four port 2×2 melt-drawn type optical fiber coupler 54 like the one shown in FIG. 5 is provided between the laser light source 11 and the optical fiber amplifier 21, and the signal light Ls, the optical fiber amplifier 21, the signal light detector 51 previously described, and the ASE photodetector 52 are coupled to the ports. The optical fiber coupler 54, for example, may be made to have a branching ratio of 99:1, so that it branches off 1% of the signal light Ls that is incident from the signal light generation unit 10 to the signal light detector 51, and so that it branches off 1% of the backward propagated spontaneously emitted light ("backward ASE light") generated by the optical fiber amplifier 21 and progressing toward the incidence side, to the ASE photodetector 52. In FIG. 5, an example is shown of a structure in which a band pass filter BPF is provided that passes only backward propagated spontaneously emitted light in the 1030 nm wavelength band.

Figure 6:
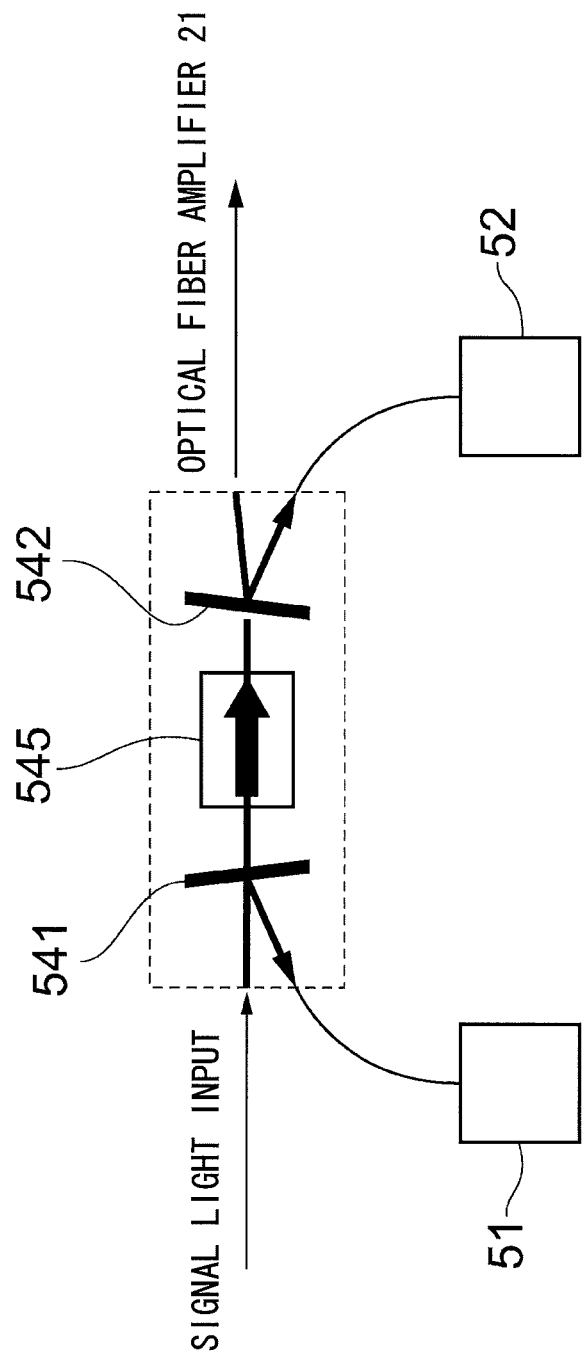
FIG. 6 shows an example, for the first aspect of the present invention, of a connection structure in which a partial reflection mirror or the like is employed.

It should be understood that, instead of the optical fiber coupler 54 described above, it would also be acceptable to arrange to provide a structure in which a wavelength selective partial reflection mirror is used that totally reflects light in the 1030 nm wavelength band while passing 99% (i.e. reflecting 1%) of light of wavelength 1064 nm, so that reflected light of wavelength 1064 nm incident from the signal light generation unit 10 and reflected is made to be incident upon the signal light detector 51, while ASE light in the 1030 nm wavelength band incident from the amplification unit 20 and reflected is made to be incident upon the ASE photodetector 52. Or, as shown in FIG. 6, it would also be possible to provide a structure in which a partial reflection mirror 541 that passes 99% (i.e. reflects 1%) of light of 1064 nm wavelength and a dichroic mirror 542 that passes light of 1064 nm wavelength and reflects light in the 1030 nm wavelength band are combined, and an isolator 545 is provided between them that blocks light in the 1030 nm waveband.

The ASE photodetector 52 is a high speed infrared light detector operating on a MHz order band or higher; for example, a sensor that employs an InGaAs photodiode may be used. The detection signal from the signal light detector 51 and the detection signal from the ASE photodetector 52 are inputted to the control unit 25. It should be understood that, for the operation of the control unit 25 on the basis of the detection signal from the signal light detector 51, duplicated explanation is omitted, since it has been described in detail in the above explanation of the involuntary oscillation prevention device 50A in the first structure. In the following, the operation of the control unit 25 on the basis of the detection signal from the ASE photodetector 52 will be explained.

When the intensity of the ASE light detected by the ASE photodetector 52 becomes greater than or equal to a predetermined ASE reference value, the control unit 25 outputs a command signal to the power circuit breaker 55 for cutting off the supply of electric power, and due thereto the supply of pumping power from the current supply 26 to the pump light source 23 is intercepted.

The "ASE reference value" is set on the basis of the intensity of the backward propagated ASE light when the gain in the optical fiber amplifier 21 for light on the 1030 nm band becomes equal to the oscillation threshold value. As previously described, since in the gain distribution of Yb the gain in the 1030 wavelength band is higher than at the wavelength of 1064 nm, accordingly if, in the state with the optical fiber amplifier 21 pumped, the incidence of signal light Ls is interrupted, or some type of reflective element is present external to the optical fiber amplifier 21, then ASE light in the vicinity of 1030 nm emitted by spontaneous emission is reflected back by these reflective elements, so that the level of feedback to the amplifier becomes high. As a result, the power level of the ASE light increases. As such a reflective element external to the optical fiber amplifier 21, for example, fouling upon the incidence or emission surface of the optical fiber 22, or fouling upon the incidence or the emission surface of a wavelength conversion optical element that wavelength converts the amplified light emitted from the optical fiber amplifier 21, or the like, may be cited. In this type of case, effectively, the return loss of the fiber amplifier increases and the oscillation threshold value drops. And, if the gain at the 1030 nm wavelength is greater than the oscillation threshold value, then laser oscillation at 1030 nm takes place in the optical fiber amplifier 21.

The "ASE reference value" is set on the basis of the intensity of the backward propagated ASE light when, in the optical fiber amplifier 21, the gain of light at 1030 nm becomes equal to the oscillation threshold value, and this is set to be less than or equal to the intensity of the backward propagated ASE light at this time, and for example may be set to from around a tenth to around a hundredth thereof.

The time period from when the intensity of the backward propagated ASE light detected by the ASE photodetector 52 becomes greater than or equal to the ASE reference value until the pumping power is substantially cut off by the power circuit breaker 55 is set on the basis of the time period until the gain on the 1030 nm wavelength band becomes equal to the oscillation threshold value, and is set to be less than or equal to this time period, for example being set to around a fraction thereof. The ASE reference value is set into a memory (not shown in the figures) provided to the control unit 25 and stored therein.

Simulation results are shown in FIG. 2 for the change over time of the gain at the 1030 nm wavelength band when, in the state in which the optical fiber amplifier 21 is pumped, the incident signal light Ls is suddenly interrupted. As shown in FIG. 2, when the signal light Ls is interrupted, the population inversion ratio of the Yb rises abruptly, and the gain at the wavelength of 1030 nm increases exponentially as time elapses. The time period from when the signal light Ls is interrupted until oscillation is reached is about 10 μsec when the return loss of the optical fiber amplifier 21 is −50 dB.

If the ASE reference value is assumed to be around 1/50 of the intensity of the backward propagated ASE light when the optical gain at the wavelength of 1030 nm becomes equal to the oscillation threshold value, then the time period required for oscillation to be reached from when the ASE intensity exceeds the ASE reference value is generally around 5 μsec. Due to this, if the pumping power is substantially cut off within about 2 to 4 μsec from when the intensity of the backward propagated ASE becomes greater than or equal to the ASE reference value, then it is possible to suppress increase of the population inversion, so that it is possible to prevent unintended oscillation of the optical fiber amplifier 21 from occurring. This time period until the pumping power is cut off is set into a memory (not shown in the figures) provided to the control unit 25 and stored therein.

In this laser device 2, when the detection signal inputted from the ASE photodetector 52 becomes greater than or equal to the ASE reference value, then the control unit 25 outputs a command signal to the power circuit breaker 55 for cutoff of the supply of electrical power, and the supply of pumping power from the current supply 26 to the pump light source 23 is immediately cut off. The time period required for the power circuit breaker 55 to cut off the pumping power on the basis of this command signal is less than 1 μsec. Due to this, it is possible substantially to cut off the pumping power before the gain at the wavelength of 1030 nm rises up to the oscillation threshold value, so that it is possible to prevent the optical fiber amplifier 21 from undergoing unintended oscillation.

According to this laser device 2 equipped with the involuntary oscillation prevention device 50B, in addition to the beneficial effects obtained when the involuntary oscillation prevention device 50A is installed, it is also possible, on a pre-emptive basis, to prevent the structural elements from suffering damage or the like due to occurrence of unintended oscillation of the optical fiber amplifier 21, even if fouling or waste should adhere to the incidence or emission surface of the optical fiber 22 or to an incidence or emission surface of a wavelength conversion optical element in a subsequent stage, or if spontaneous emission should be caused by return light reflected back from an object that is being processed or the like. Furthermore, by employing this simple structure in which the fiber coupler 54, the signal light detector 51, and the ASE photodetector are provided on the incidence side of the optical fiber amplifier 21, it is possible to provide a laser device whose security and long term reliability are high.

While, in the above explanation, an example has been shown of a structure in which the cutting off of the supply of electrical power to the pump light source 23 is performed by the power circuit breaker 55 that is provided between the pump light source 23 and the current supply 26, it would also be acceptable to arrange for the current supply 26 itself to be turned off. Moreover, while an example has been shown in which the wavelength of the signal light Ls is in the 1060 nm wavelength band, and an ytterbium doped optical fiber amplifier (YDFA) is used as the optical fiber amplifier 21, it would also be acceptable for the wavelength of the signal light to be in some other band, and for the optical fiber amplifier to be doped with some other laser medium: for example, it could be an erbium doped optical fiber amplifier (EDFA) or the like.

Embodiment #2

Figure 7:
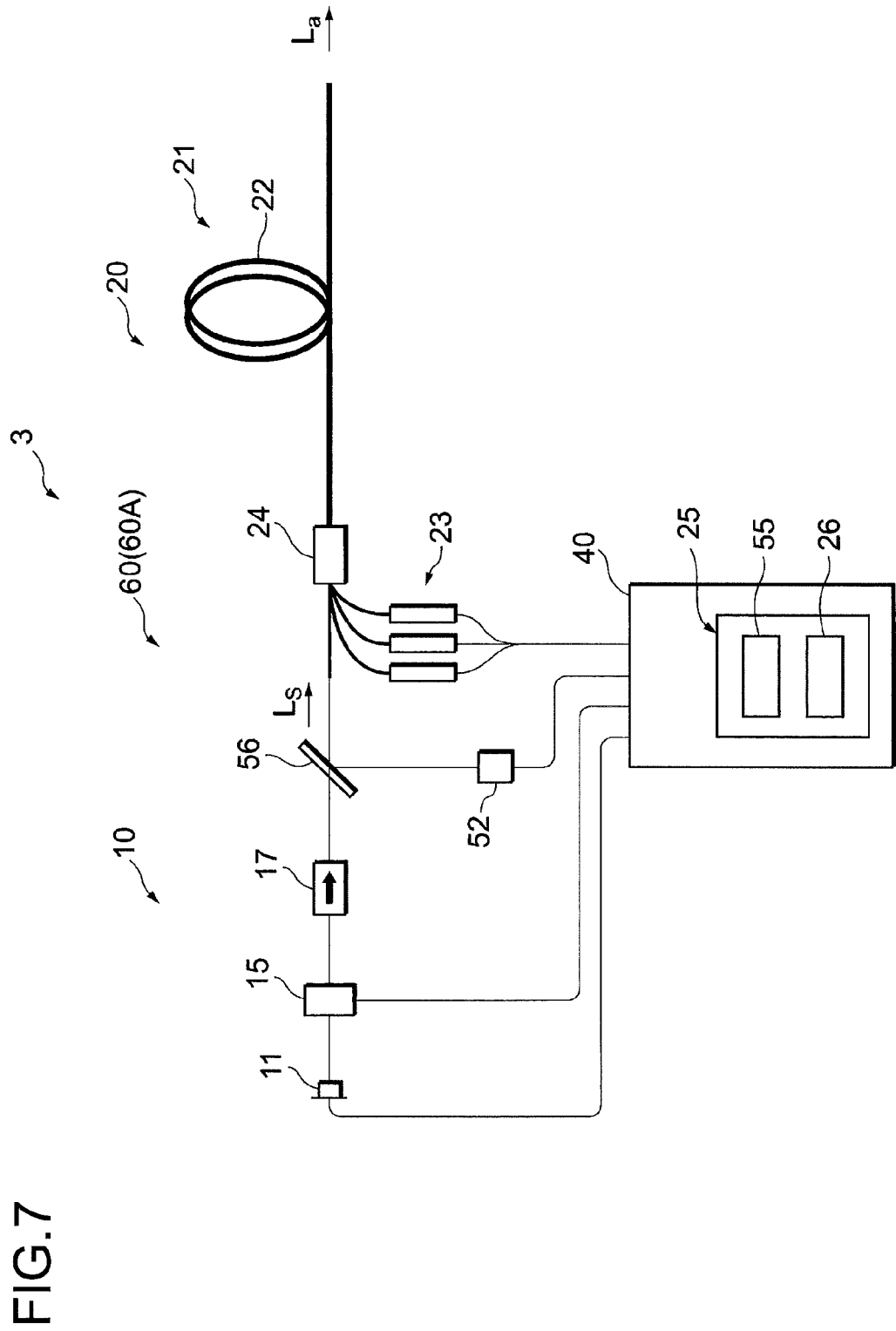
FIG. 7 is an overall structural diagram showing an example of a laser device of a third structure according to a second aspect of the present invention.

Next, a second embodiment for implementation of the present invention will be explained with reference to FIG. 7. A summary structural diagram is shown in FIG. 7 of a laser device 3 having a third structure, to which the present invention is applied. This laser device 3 comprises a signal light generation unit 10 that generates signal light, an amplification unit 20 that amplifies and emits the signal light generated by the signal light generation unit, and a control device 40 that controls the operation of the signal light generation unit 10 and of the amplification unit 20.

The signal light generation unit 10 is an element that generates signal light for amplification by the amplification unit 20, and it comprises a laser light source 11 such as a semiconductor laser or a bulk solidstate laser, a fiber laser, or the like. The structure shown in FIG. 7 uses a DFB semiconductor laser as the laser light source 11, and this structure is provided with an external modulator 15 such as an electro-optic modulation element (an EOM), an acoustic optical modulation element (AOM), or a semiconductor optical amplifier (SOA) or the like. The DFB semiconductor laser can be made to perform either CW or pulse oscillation, with the pulse waveform of the output light being controlled at high speed due to the current waveform being controlled, and moreover can be made to output pulsed light of a single wavelength whose band has been narrowed to a predetermined wavelength range by temperature control.

With this structure, an example is shown in which pulse light is emitted from the laser light source 11 repeatedly at a wavelength of 1064 nm, having frequency 2 MHz and with ON interval of around 10 nsec, and this is chopped by the external modulator 15 for 1 to 2 nsec, so that light pulses whose ON interval is very short are outputted. When the external modulator 15 is employed in this manner, it is possible to suppress chirping (frequency variation) generated when the laser light source 11 is made to perform direct pulse oscillation, and it is possible to generate pulse light that is close to the Fourier transform limited pulse. Due to this, it is possible to output highly monochromatic signal light pulses on an extremely narrow band from the signal light generation unit 10. The signal light Ls generated by the signal light generation unit 10 is incident upon the amplification unit 20 via an isolator 17.

The amplification unit 20 mainly consists of an optical fiber amplifier 21 that amplifies the signal light Ls. As an optical fiber amplifier that amplifies signal light of wavelength 1064 nm, an ytterbium doped optical fiber amplifier (YDFA) that has gain in the wavelength band of 1030~1100 nm may appropriately be employed. The optical fiber amplifier 21 comprises an optical fiber 22 whose core is doped with ytterbium (Yb), a pump light source 23 that pumps the Yb, a control unit 25 that controls the pumping power supplied to the pump light source 23, and so on.

In this structure, a fiber having a double clad structure is used for the optical fiber 22, and, via a pump combiner 24, the signal light Ls outputted from the laser light output unit 10 is brought to be incident upon the core, while pump light of wavelength 976 nm outputted from the pump light source 23 is brought to be incident upon the first clad layer. A current supply 26 that generates pumping power and a power circuit breaker 55 that cuts off the supply of generated pumping power to the pump light source 23 at high speed are provided to the control unit 25. It should be understood that it would also be acceptable to use a fiber of single clad structure as the optical fiber 22, and it would also be acceptable to build the amplification unit 20 by connecting a plurality of optical fiber amplifiers in series or in parallel.

The control device 40 controls the operation of the signal light generation unit 10 and of the amplification unit 20, and thereby causes signal light La to be outputted from the laser device 3 that has been generated by the signal light generation unit 10 and has been amplified by the amplification unit 20 to a power of from around several watts to around several tens of watts (for convenience, termed "amplified light").

An involuntary oscillation prevention device 60 (60A) that prevents the optical fiber amplifier 21 from undergoing unintended oscillation on a pre-emptive basis is provided to the laser device 3 having this structure. This involuntary oscillation prevention device 60A provided to the third structure comprises an ASE photodetector 52 that detects light in the 1030 nm wavelength band emitted from the optical fiber amplifier 21, and a power circuit breaker 55 that is provided to the control unit 25.

Here, the ASE light that is generated due to spontaneous emission in the optical fiber amplifier 21 includes forward propagated spontaneously emitted light that progresses towards the amplified light emission side of the optical fiber 22 ("forward ASE"), and backward propagated spontaneously emitted light that progresses towards its signal light incidence side ("backward ASE"). The forward propagated spontaneously emitted light can be detected when an ASE detector is provided upon an optical path that is branched off from the emission side of the optical fiber 22, and the backward propagated spontaneously emitted light can be detected when an ASE photodetector is provided upon an optical path that is branched off from the incidence side of the optical fiber 22.

An example will now be shown in which the backward propagated spontaneously emitted light is detected with this structure. In FIG. 7, a structure is shown in which it is arranged to provide, between the laser light source 11 and the optical fiber amplifier 21, a dichroic mirror 56 that passes light in the 1064 nm wavelength band while reflecting light in the 1030 nm wavelength band, and to detect the backward propagated spontaneously emitted light that is reflected by this dichroic mirror 56 with the ASE photodetector 52. It should be understood that it would also be acceptable to use a WDM coupler, instead of the dichroic mirror 56.

The ASE photodetector 52 is a high speed infrared light detector that operates on a MHz order band or higher; for example, a sensor that employs an InGaAs photodiode may be used. The detection signal from the ASE photodetector 52 is inputted to the control unit 25.

When the intensity of the ASE light detected by the ASE photodetector 52 becomes greater than a predetermined ASE reference value, the control unit 25 outputs a command signal to the power circuit breaker 55 for cutting off the supply of electric power, and thereby the supply of pumping power from the current supply 26 to the pump light source 23 is substantially intercepted.

The "ASE reference value" is set on the basis of the intensity of the backward propagated ASE light when the gain in the optical fiber amplifier 21 for light on the 1030 nm band becomes equal to the oscillation threshold value. As previously described, since in the gain distribution of Yb the gain in the 1030 wavelength band is higher than at the wavelength of 1064 nm, accordingly if, in the state with the optical fiber amplifier 21 pumped, the incidence of signal light Ls is interrupted, or some type of reflective element is present external to the optical fiber amplifier 21, then ASE light in the vicinity of 1030 nm that is emitted by spontaneous emission is reflected by these reflective elements, so that the level of feedback to the amplifier becomes high. As a result, the power level of the ASE light increases. As such a reflective element external to the optical fiber amplifier 21, for example, fouling upon the incidence or emission surface of the optical fiber 22, or fouling upon the incidence or the emission surface of a wavelength conversion optical element that wavelength converts the amplified light emitted from the optical fiber amplifier 21, or the like, may be cited. In this type of case, effectively, the return loss of the fiber amplifier increases and the oscillation threshold value drops. And, if the gain at the 1030 nm wavelength is greater than the oscillation threshold value (i.e. if the one-way gain at the wavelength of 1030 nm is greater than the return loss of the optical fiber amplifier 21), then laser oscillation at 1030 nm may occur in the optical fiber amplifier 21.

The "ASE reference value" is set on the basis of the intensity of the backward propagated ASE light when, in the optical fiber amplifier 21, the gain of light at 1030 nm becomes equal to the oscillation threshold value, and this is set to be less than or equal to the intensity of the backward propagated ASE light at this time, for example to from around a tenth to around a hundredth thereof.

The time period from when the intensity of the backward propagated ASE light detected by the ASE photodetector 52 becomes greater than or equal to the ASE reference value until the pumping power is substantially cut off by the power circuit breaker 55 is set on the basis of the time period until the gain on the 1030 nm wavelength band becomes equal to the oscillation threshold value, and is set to be equal to or less than this time period, for example being set to around a fraction thereof. The ASE reference value is set into a memory (not shown in the figures) provided to the control unit 25 and is stored therein.

Figure 8:
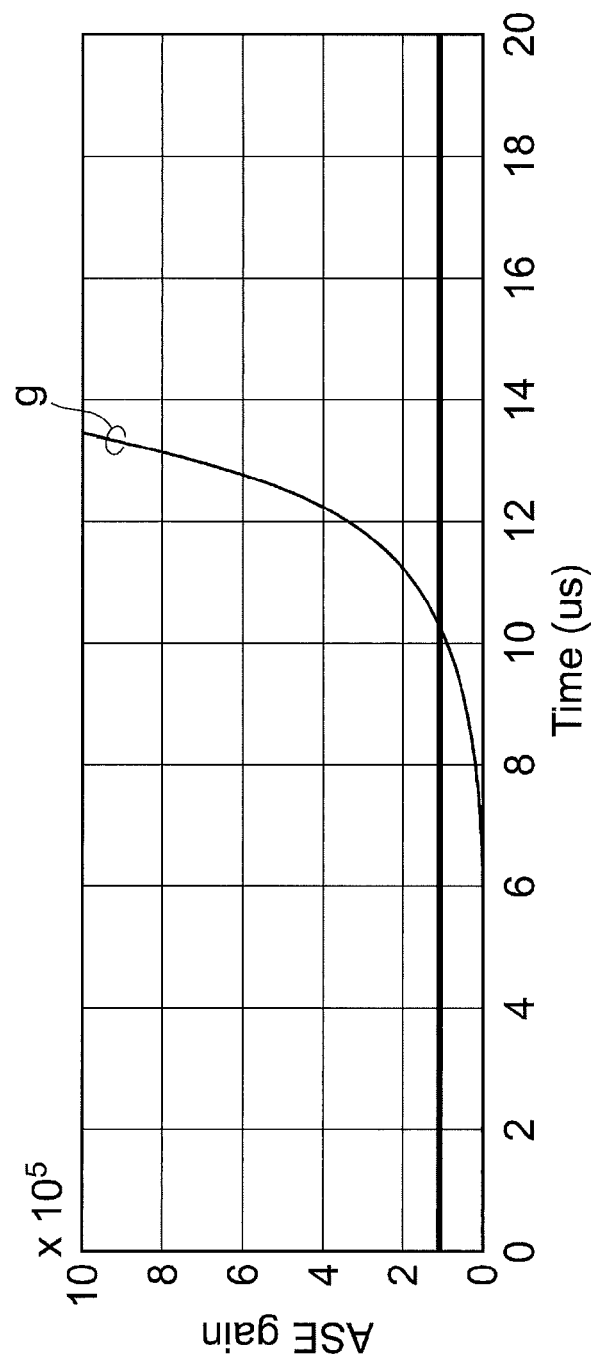
FIG. 8 is a figure showing simulation results for the second aspect of the present invention, giving an example of change over time of the gain at 1030 nm wavelength when, with an ytterbium doped optical fiber amplifier in the pumped state, the signal light is suddenly interrupted.

As a concrete example, simulation results are shown in FIG. 8 for the change over time of the gain in the 1030 nm wavelength band when, in the state in which the power of the signal light Ls incident upon the optical fiber amplifier 21 is 0.5 W and the power of the pump light from the pump light source 23 is operating at 120 W, the incidence of the signal light Ls upon the optical fiber amplifier is suddenly interrupted. The horizontal axis in FIG. 8 shows the elapsed time from when the incidence of the signal light Ls is interrupted, and the vertical axis shows the gain for light at the 1030 nm wavelength band. It should be understood that the optical fiber amplifier 21 was made to have length 3 m, core diameter 25 μm, and cladding diameter 250 μm, and that Yb was added to its core at a density of $6.9 \times 10^{25}/m^3$.

If pump light continues to be incident upon the optical fiber amplifier 21 even after the signal light Ls has been interrupted, then the population inversion ratio of the Yb rises abruptly, and the gain at the wavelength of 1030 nm increases exponentially as time elapses. The oscillation threshold value depends upon the amount of reflected light that still remains in the optical fiber amplifier 21 and so on, and its value varies according to the structure of the optical fiber amplifier. Supposing that the return loss of the optical fiber amplifier 21 is −50 dB, then it will oscillate at 1030 nm when the one-way gain becomes greater than 50 dB. It will be understood from FIG. 8 that oscillation is reached at about 10 pee from the time point at which the signal light Ls is interrupted. Since the time period until the one-way gain of the optical fiber amplifier 21 exceed the return loss is almost inversely proportional to the power of the pump light, accordingly oscillation is reached in a shorter time period than that described above if the power of the pump light is higher, while conversely oscillation is reached in a longer time period if the power of the pump light is lower.

If the ASE reference value is assumed to be around 1/50 of the intensity of the backward propagated ASE light when the optical gain at the wavelength of 1030 nm becomes equal to the oscillation threshold value, then the time period for oscillation to be reached from when the ASE intensity exceeds the ASE reference value is generally around 5 μsec. Due to this, if the pumping power is substantially cut off within about 2 to 4 μsec from when the intensity of the backward propagated ASE becomes greater than or equal to the ASE reference value, then it is possible to suppress increase of the population inversion, so that it is possible to prevent unintended oscillation of the optical fiber amplifier 21 from occurring.

In this laser device 3, when the detection signal inputted from the ASE photodetector 52 becomes greater than or equal to the ASE reference value, then the control unit 25 outputs a command signal to the power circuit breaker 55 for cutoff of the supply of electrical power, and the supply of pumping power from the current supply 26 to the pump light source 23 is immediately cut off. The time period required for the power circuit breaker 55 to cut off the pumping power on the basis of this command signal is less than 1 μsec (the time period for cutting off the pumping power will be discussed hereinafter). Due to this, it is possible substantially to cut off the pumping power before the gain at the wavelength of 1030 nm rises up to the oscillation threshold value, so that it is possible to prevent unintended oscillation. The time period until the pumping power is cut off is set into a memory (not shown in the figures) that is provided to the control unit 25 and is stored therein.

According to this laser device 3 equipped with the involuntary oscillation prevention device 60A, even if spontaneous emission should be caused by fouling or waste adhering to the incidence or emission surface of the optical fiber 22 or to an incidence or emission surface of a wavelength conversion optical element in a subsequent stage, or by return light reflected back from an object that is being processed or the like, it is still possible, on a pre-emptive basis, to prevent the structural elements from suffering damage or the like due to occurrence of unintended oscillation of the optical fiber amplifier 21.

Figure 9:
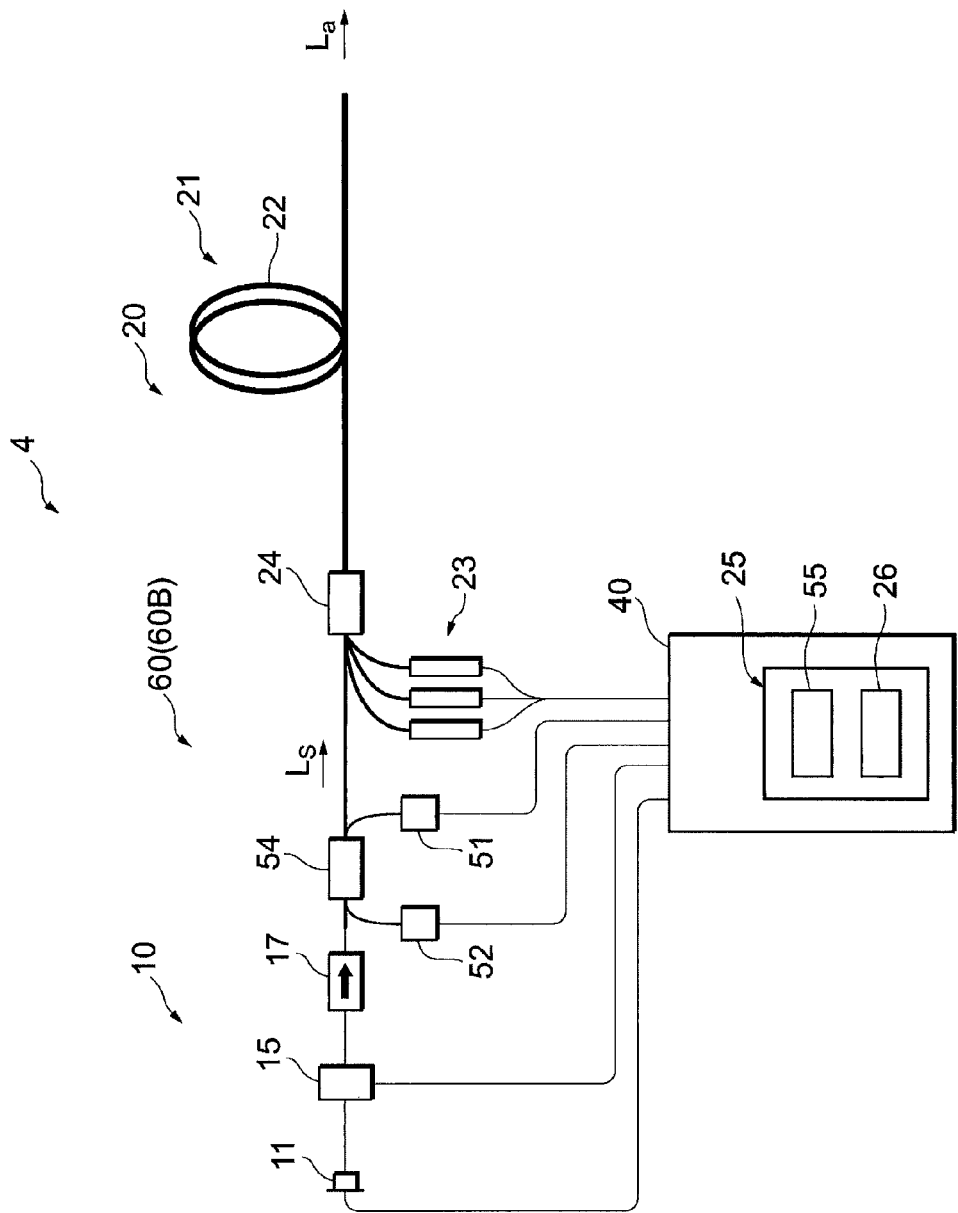
FIG. 9 is an overall structural diagram showing an example of a laser device of a fourth structure according to the second aspect of the present invention.

Next, an involuntary oscillation prevention device 60 (60B) having a fourth structure will be explained with reference to FIG. 9. A summary structural diagram of a laser device 4 that includes this involuntary oscillation prevention device 60B is shown in FIG. 9. To structural elements that are similar to ones of the laser device 3 described above, the same reference symbols are appended, and duplicated explanation is omitted. This involuntary oscillation prevention device 60B is constructed by further adding, to the involuntary oscillation prevention device 60A of the third structure described above, a signal light detector 51 that detects the signal light Ls propagating in the optical fiber amplifier 21.

Figure 10:
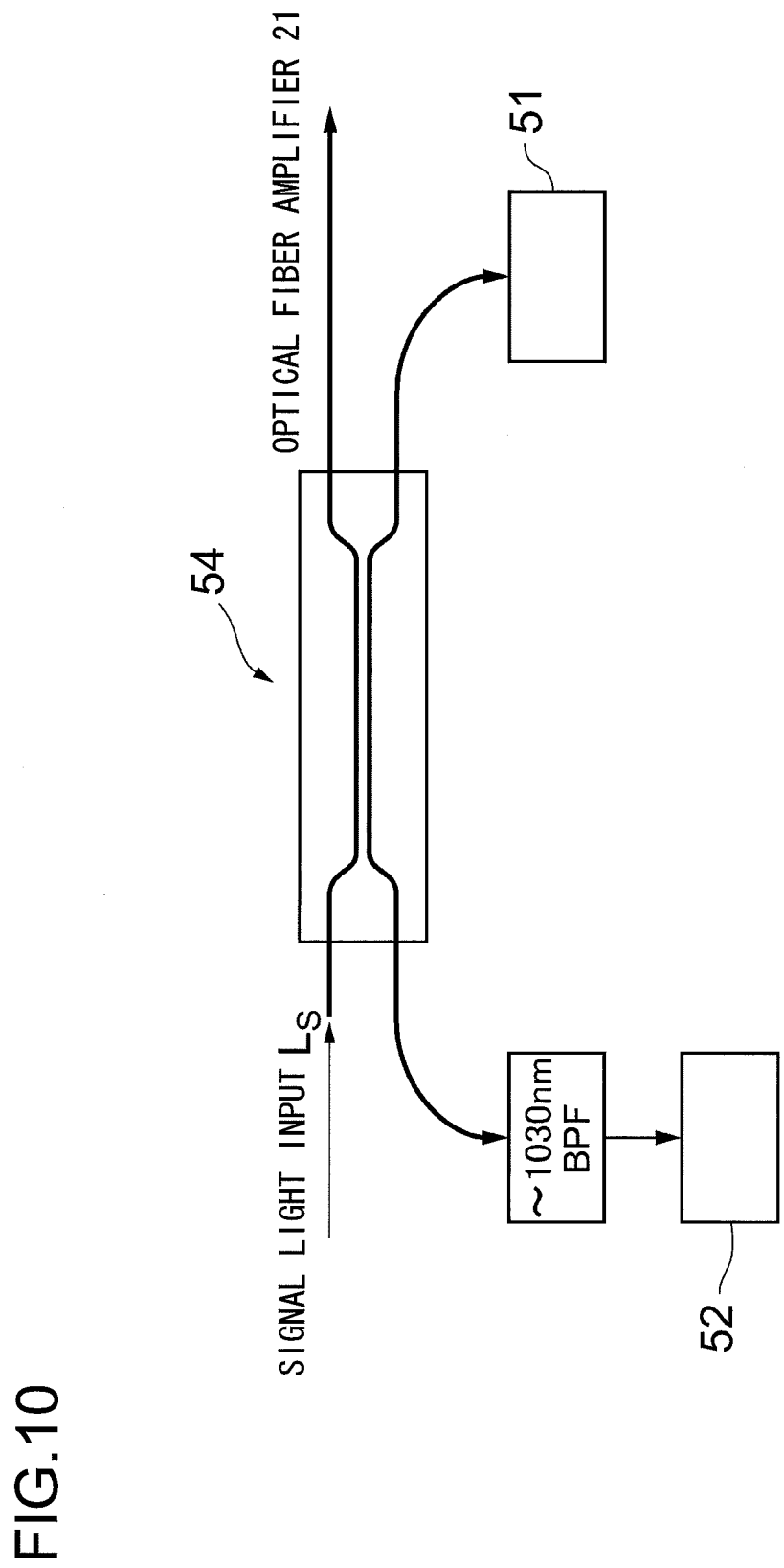
FIG. 10 shows an example, for the second aspect of the present invention, of a connection structure of an optical fiber coupler.

In the laser device 4 shown in FIG. 9, a four port 2×2 melt-drawn type optical fiber coupler 54 like the one shown in FIG. 10 is provided between the laser light source 11 and the optical fiber amplifier 21, and the signal light Ls, the optical fiber amplifier 21, a signal light detector 51, and the ASE photodetector 52 previously described are coupled to its ports. The optical fiber coupler 54, for example, may be made to have a branching ratio of 99:1, so that it branches off 1% of the signal light Ls that is incident from the signal light generation unit 10 to the signal light detector 51, and so that it branches off 1% of the backward propagated spontaneously emitted light ("backward ASE light") generated by the optical fiber amplifier 21 and progressing to the incidence side, to the ASE photodetector 52. In FIG. 10, an example is shown of a structure in which a band pass filter BPF is provided that passes only backward propagated spontaneously emitted light in the 1030 nm wavelength band.

Figure 11:
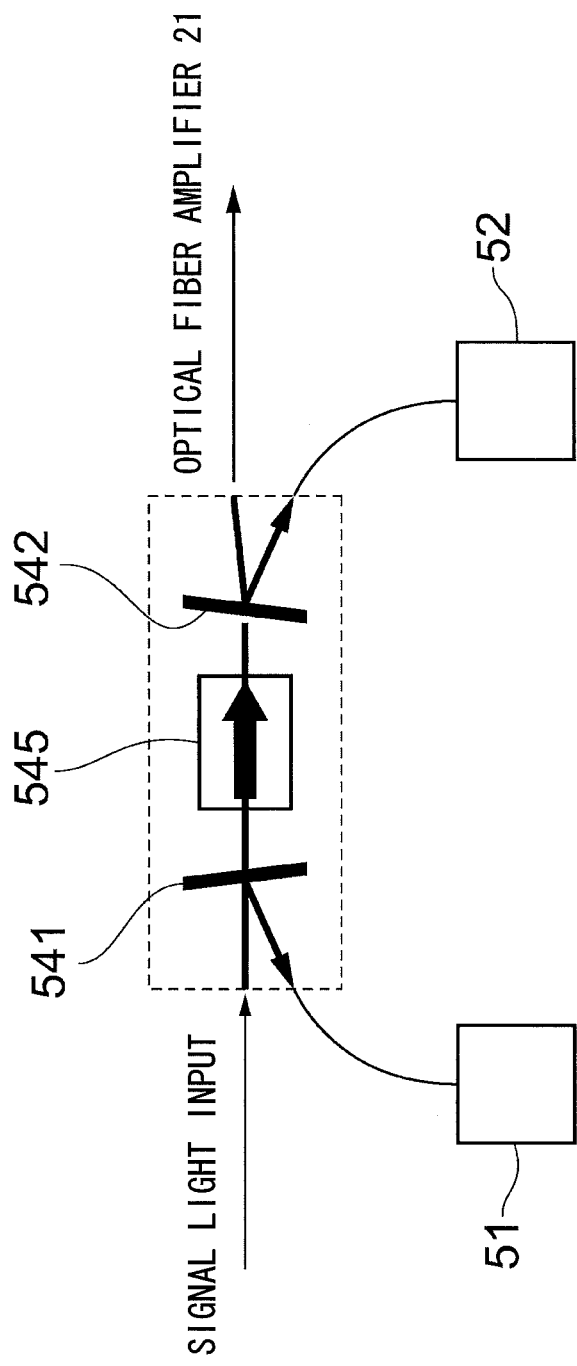
FIG. 11 shows an example, for the second aspect of the present invention, of a connection structure in which a partial reflection mirror or the like is employed.

It should be understood that, instead of the optical fiber coupler 54 described above, it would also be acceptable to arrange to provide a structure in which a wavelength selective partial reflection mirror is used that totally reflects light in the 1030 nm wavelength band while passing 99% and reflecting 1% of light of wavelength 1064 nm, so that reflected light of wavelength 1064 nm incident from the signal light generation unit 10 and reflected is made to be incident upon the signal light detector 51, while ASE light in the 1030 nm wavelength band incident from the amplification unit 20 and reflected is made to be incident upon the ASE photodetector 52. Or, as shown in FIG. 11, it would also be possible to provide a structure in which a partial reflection mirror 541 that passes 99% (i.e. reflects 1%) of light of 1064 nm wavelength and a dichroic mirror 542 that passes light of 1064 nm wavelength and reflects light in the 1030 nm wavelength band are combined, and an isolator 545 is provided between them that intercepts light in the 1030 nm waveband.

The signal light detector 51 is a high speed infrared light detector operating on a MHz order band or higher; for example, a sensor that employs an InGaAs photodiode may be used. The detection signal from the signal light detector 51 and the detection signal from the ASE photodetector 52 are inputted to the control unit 25. It should be understood that, for the operation of the control unit 25 on the basis of the detection signal from the ASE photodetector 52, duplicated explanation is omitted, since it has been described in detail in the explanation of the involuntary oscillation prevention device 50A in the first structure. In the following, the operation of the control unit 25 on the basis of the detection signal from the signal light detector 51 will be explained.

When the intensity of the signal light Ls detected by the signal light detector 51 becomes less than or equal to a predetermined signal reference value, the control unit 25 outputs a command signal to the power circuit breaker 55 for cutting off of the supply of electric power, and due thereto the supply of pumping power from the current supply 26 to the pump light source 23 is intercepted.

The "signal reference value" is set on the basis of the magnitude of the gain in the 1030 nm wavelength band that rises along with decrease of the intensity of the signal light Ls incident upon the optical fiber 22, in the state in which the optical fiber amplifier 21 is pumped.

In other words, if the intensity of the signal light Ls incident upon the optical fiber decreases when the optical fiber amplifier 21 is in the pumped state, the population inversion ratio of the Yb rises along with reduction of the signal light intensity, and the entire gain distribution rises towards the high gain state. At this time, in the gain distribution, the gain in the 1030 nm wavelength band becomes higher than the gain at 1064 nm wavelength, and as a result the elevated gain at the 1030 nm wavelength becomes higher than the oscillation threshold value, so that laser oscillation at 1030 nm takes place in the optical fiber amplifier 21.

The "signal reference value" is set on the basis of the intensity of the signal light when, in the gain distribution that has risen along with decrease of the intensity of the signal light Ls incident upon the optical fiber amplifier 21, the gain in the 1030 nm band becomes equal to the oscillation threshold value. For example, it may be set to a value that is equal to the intensity of the signal light Ls, or with a predetermined margin added thereto. This signal reference value is set into a memory (not shown in the figures) provided to the control unit 25 and is stored therein.

The time period from when the intensity of the signal light Ls detected by the signal detector 51 becomes less than or equal to the signal reference value until the pumping power is substantially cut off by the power circuit breaker 55 is set on the basis of the time period until, in the gain distribution that rises along with reduction of the intensity of the signal light Ls incident upon the optical fiber amplifier 21, the gain on the 1030 nm band becomes equal to the oscillation threshold value, and is set to be less than or equal to this time period, for example being set to around a fraction thereof. This time period is set into a memory (not shown in the figures) provided to the control unit 25 and is stored therein.

Simulation results are shown in FIG. 8 for the change over time of the gain at the 1030 nm wavelength band when, in the state in which the optical fiber amplifier 21 is pumped, the incidence of the signal light Ls is suddenly interrupted. As shown in FIG. 8, when the signal light Ls is interrupted, the population inversion ratio of the Yb rises abruptly, and the gain at the wavelength of 1030 nm increases exponentially as time elapses. The time period from when the signal light Ls is interrupted until oscillation is reached is about 10 μsec when the return loss of the optical fiber amplifier 21 is −50 dB.

Since the time period until the one-way gain of the optical fiber amplifier 21 exceeds the return loss is almost inversely proportional to the power of the pump light, accordingly oscillation is reached in a shorter time period if the power of the pump light is higher, while conversely oscillation is reached in a longer time period if the power of the pump light is lower. If the pumping power is substantially cut off within around 6 to 8 μsec from when the incident power of the signal light Ls greatly decreases, then it is possible to suppress the increase of population inversion, and to prevent the optical fiber amplifier 21 from undergoing unintended oscillation.

In this involuntary oscillation prevention device 60B, when the detection signal inputted from the signal light detector 51 becomes less than or equal to the signal reference value, then the control unit 25 outputs a command signal to the power circuit breaker 55 for interception of the supply of electrical power, and the supply of pumping power from the current supply 26 to the pump light source 23 is cut off within a few μsec. As a concrete example, a case will now be shown in which the device is constructed so as to cut off the supply of pumping power to the pump light source 23 immediately when, in the detection signal inputted from the signal light detector 51, signal light Ls has not been detected for a time period of 1 to 3 μsec, this being equivalent to two to six optical pulses (for example, a period of 2 μsec may correspond to four pulses).

Figure 12:
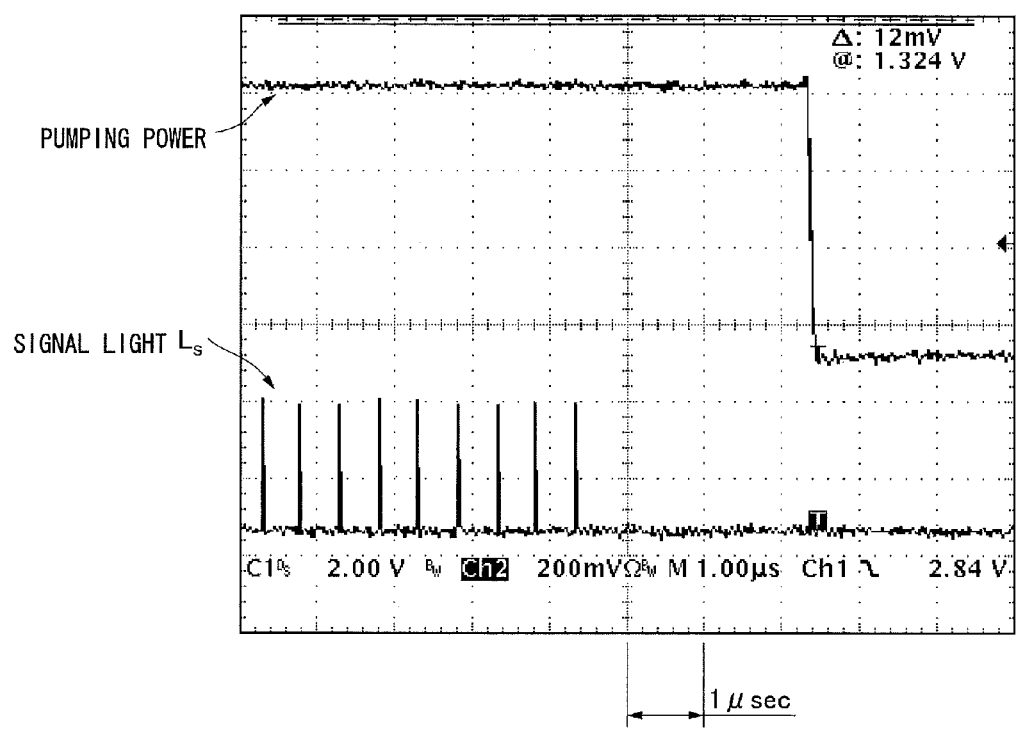
FIG. 12 is a figure showing experimental results for the second aspect of the present invention, in which suppression of the pump current by an involuntary oscillation prevention device is observed.

Experimental results observed for a situation in which the pump current is intercepted by such an involuntary oscillation prevention device are shown in FIG. 12. The horizontal axis in FIG. 12 shows time (1 μsec per division), while the vertical axis shows the optical intensities of the pumping power and of the signal light Ls. In this embodiment, the pumping power to the pump light source 23 is cut off after confirming interruption during 2 μsec, this corresponding to four optical pulses, and the time period required for the power circuit breaker 55 to cut off the pumping power is less than 1 μsec.

With this laser device 4 equipped with the involuntary oscillation prevention device 60B, when the incident power of the signal light Ls greatly decreases with the optical fiber amplifier 21 remaining just as it is in the pumped state, it is possible substantially to cut off the pumping power before the gain at the 1030 nm wavelength rises to reach the oscillation threshold value, so that it is possible to suppress the occurrence of unintended oscillation of the optical fiber amplifier 21. According to this structure, in addition to the beneficial effects obtained when the involuntary oscillation prevention device 60A described above is installed, it is also possible, on a pre-emptive basis, to prevent occurrence of unintended oscillation of the optical fiber amplifier 21, and as a result to prevent the structural elements from suffering damage and so on, not only when the laser light source 11 goes to off with the optical fiber amplifier 21 in the pumped state, but also even if, for example, cutting off of the signal light Ls should take place due to the laser light source 11 or the external modulator 15 being damaged or going open circuit, or due to the ingress of some foreign body upon the optical path between the laser light source 11 and the optical fiber amplification unit 21 or due to the entrance portion of the optical fiber 22 being interrupted or the like. Furthermore, it is possible to provide a laser device whose security and long term reliability are high, due to this simple structure in which the fiber coupler 54, the signal light detector 51, and the ASE photodetector are provided on the incidence side of the optical fiber amplifier 21.

While, in the above explanation, an example has been shown of a structure in which the cutting off of the supply of electrical power to the pump light source 23 is performed by the power circuit breaker 55 that is provided between the pump light source 23 and the current supply 26, it would also be acceptable to arrange for the current supply 26 itself to be turned off. Moreover, while an example has been shown in which the wavelength of the signal light Ls is in the 1060 nm wavelength band, and an ytterbium doped optical fiber amplifier (YDFA) is used as the optical fiber amplifier 21, it would also be acceptable for the wavelength of the signal light to be in some other band, and for the optical fiber amplifier to be doped with some other laser medium: for example, it could be an erbium doped optical fiber amplifier (EDFA) or the like.

While various embodiments and variant embodiments have been explained in the above description, the present invention is not to be considered as being limited by the details thereof.

The disclosures of the following priority applications are herein incorporated by reference:
Japanese Patent Application No. 2011-009122 (filed on Jan. 19, 2011); and
Japanese Patent Application No. 2011-009126 (filed on Jan. 19, 2011).

The invention claimed is:

1. A laser device, comprising:
an optical fiber amplifier having gain in a wavelength band that includes signal light, and that amplifies and emits the signal light;
a control unit that is configured to control pumping power for pumping the optical fiber amplifier; and
a signal light detector that detects the signal light being propagated to the optical fiber amplifier, or an ASE photodetector that detects light that is emitted from the optical fiber amplifier and that has wavelength for which the gain, in the gain distribution of the optical fiber amplifier, is higher than for the signal light, wherein:
the control unit suppresses the pumping power for pumping the optical fiber amplifier, when the intensity of the signal light detected by the signal light detector becomes less than or equal to a predetermined signal reference value, or when the intensity of the spontaneously emitted light detected by the ASE photodetector becomes greater than or equal to a predetermined ASE reference value; and
the time period during which the pumping power is suppressed is set on the basis of a time period for the gain for light of a wavelength at which the gain is higher than the gain for the signal light to become equal to an oscillation threshold value.

2. A laser device, comprising:
an optical fiber amplifier having gain in a wavelength band that includes signal light, and that amplifies and emits the signal light;
a signal light detector that detects the signal light being propagated to the optical fiber amplifier; and
a control unit that is configured to control pumping power for pumping the optical fiber amplifier, wherein:
the control unit suppresses the pumping power for pumping the optical fiber amplifier, when the intensity of the signal light detected by the signal light detector becomes less than or equal to a predetermined signal reference value; and
the time period during which the pumping power is suppressed is set on the basis of a time period for the gain for light of a wavelength at which the gain is higher than the gain for the signal light to become equal to an oscillation threshold value.

3. The laser device according to claim 2, wherein the predetermined signal reference value is set on the basis of the intensity of the signal light when, in the gain distribution of the optical fiber amplifier that rises along with reduction of the intensity of the signal light propagated to the optical fiber amplifier, the gain for the light at the wavelength at which the gain is higher than the gain for the signal light becomes equal to the oscillation threshold value.

4. The laser device according to claim 2, further comprising an ASE photodetector that detects light that is emitted from the optical fiber amplifier, the light having a wavelength for which the gain, in the gain distribution of the optical fiber amplifier, is higher than for the signal light, wherein
the control unit suppresses the pumping power, when the intensity of the spontaneously emitted light detected by the ASE photodetector becomes greater than or equal to a predetermined ASE reference value.

5. The laser device according to claim 4, wherein the predetermined ASE reference value is set on the basis of the intensity of spontaneously emitted light when the gain for the light at the wavelength at which the gain is higher than the gain for the signal light of the optical fiber amplifier becomes equal to the oscillation threshold value.

6. The laser device according to claim 4, wherein the time period from when the intensity of the spontaneously emitted light detected by the ASE photodetector becomes greater than or equal to the predetermined ASE reference value until the pumping power is suppressed is set on the basis of the time period for the gain for the light of the wavelength at which the gain of the optical fiber amplifier is higher than the gain for the signal light becomes equal to the oscillation threshold value.

7. The laser device according to claim 4, wherein the ASE photodetector is provided on the signal light incidence side of the optical fiber amplifier, and detects spontaneously emitted light propagated backward through the optical fiber amplifier towards its incidence side.

8. A laser device, comprising:
an optical fiber amplifier having gain in a wavelength band that includes signal light, and that amplifies and emits the signal light;
an ASE photodetector that detects light that is emitted from the optical fiber amplifier, the light having a wavelength for which the gain, in the gain distribution of the optical fiber amplifier, is higher than for the signal light; and
a control unit that is configured to control pumping power for pumping the optical fiber amplifier, wherein:
the control unit suppresses the pumping power for pumping the optical fiber amplifier, when the intensity of the spontaneously emitted light detected by the ASE photodetector becomes greater than or equal to a predetermined ASE reference value; and
the time period during which the pumping power is suppressed is set on the basis of a time period for the gain for light of a wavelength at which the gain is higher than the gain for the signal light to become equal to an oscillation threshold value.

9. The laser device according to claim 8, wherein the predetermined ASE reference value is set on the basis of the intensity of spontaneously emitted light when the gain for the light at the wavelength at which the gain is higher than the gain for the signal light of the optical fiber amplifier becomes equal to the oscillation threshold value.

10. The laser device according to claim 8, wherein the ASE photodetector is provided on the signal light incidence side of the optical fiber amplifier, and detects spontaneously emitted light propagated backward towards an incidence side of the optical fiber amplifier.

11. The laser device according to claim 8, further comprising a signal light detector that detects the signal light incident upon the optical fiber amplifier; wherein
the control unit suppresses the pumping power when the intensity of the signal light detected by the signal light detector becomes less than or equal to a predetermined signal reference value.

12. The laser device according to claim 11, wherein the predetermined signal reference value is set on the basis of the intensity of the signal light when the gain for the light at the wavelength at which the gain is higher than the gain for the signal light, in the gain distribution of the optical fiber amplifier that rises along with reduction of the intensity of the signal light incident into the optical fiber amplifier, becomes equal to the oscillation threshold value.

13. The laser device according to claim 11, wherein the time period from when the intensity of the signal light detected by the signal light detector becomes less than or equal to the predetermined signal reference value until the pumping power is suppressed is set on the basis of the time period for the gain for the light of the wavelength at which the gain is higher than the gain for the signal light, in the gain distribution of the optical fiber amplifier that rises along with decrease of the intensity of the signal light incident upon the optical fiber amplifier, to become equal to the oscillation threshold value.

14. The laser device according to claim 4, wherein an optical fiber coupler having four ports is provided on the incidence side of the optical fiber amplifier, and wherein the signal light, the optical fiber amplifier, the signal light detector, and the ASE photodetector are connected to the four ports.

15. The laser device according to claim 2, wherein the optical fiber amplifier is an ytterbium doped optical fiber amplifier that employs ytterbium as its laser medium, and the wavelength of the signal light is the 1.06 μm band.

16. The laser device according to claim 11, wherein an optical fiber coupler having four ports is provided on the incidence side of the optical fiber amplifier, and wherein the signal light, the optical fiber amplifier, the signal light detector, and the ASE photodetector are connected to the four ports.

17. The laser device according to claim 8, wherein the optical fiber amplifier is an ytterbium doped optical fiber amplifier that employs ytterbium as its laser medium, and the wavelength of the signal light is the 1.06 μm band.

* * * * *